Patented Feb. 18, 1930

1,747,175

UNITED STATES PATENT OFFICE

PAUL MAHLER, OF NEW YORK, N. Y., ASSIGNOR TO DARCO SALES CORPORATION, OF NEW YORK, N. Y., A CORPORATION OF DELAWARE

PROCESS OF TREATING DYE EFFLUENTS

No Drawing. Application filed December 3, 1925. Serial No. 73,058.

In most, if not all, dyeing processes, there are produced large volumes of effluents discolored by dyestuffs, and which are ordinarily dumped directly into the streams or sewers. This discoloration or contamination of the waters is in many cases very objectionable. It tends to kill the fish, renders the water unsuitable for bathing, and prevents its use in many industries or for drinking purposes.

The main object of my invention is to so treat such dye effluents as to remove all dyestuffs therefrom. The discoloration is usually due to a mixture of water-soluble organic dyestuffs which are generally present in very small percentage. The total volume of effluent from an ordinary cloth dyeing plant, is so large, and the quantity of dyestuffs therein so small, that the chemical treatment of the effluent to recondition it, merely results in a pollution of the water from the chemicals used and their reaction products. To decolorize the effluents by the use of decolorizing activated carbon of vegetable origin is commercially unfeasible without adequate and inexpensive revivification methods whereby the activated carbon may be repeatedly used. Therefore, as an important feature of my invention I provide a cyclic process, whereby the activated carbon is added to the effluent, separated therefrom, revivified, and used with another batch of the effluent.

My process may be varied in certain of its details, dependent upon the volume of effluent to be treated, the concentration of decolorizing substances, and the presence or absence of other substances such as gums or mordants which may pass into the water with the dyestuff in carrying out the industrial operations in the plant. Such gums are not polluting agents, and mordants are generally present in very small quantity.

If the effluent is a dilute solution, and large quantities of it are to be treated, I preferably accomplish the decolorizing action by the simultaneous action of a precipitating agent and the activated carbon. The purpose of the precipitating agent is twofold. It removes a large bulk of the dye, and at the same time it acts as a deflocculating agent of the finely suspended carbon and other fine suspensions. The precipitating agent alone does not remove all of the color, and the use of an activated carbon alone necessitates mechanical separation, such as filter-pressing. The combined and simultaneous action of the two causes a complete elimination of color, and a rapid and complete settling of all solid matter. Thus the clear supernatant liquid may be decanted without further treatment, and the sludge is in concentrated form ready for reactivation.

As an example I may precipitate a great bulk of the dye-stuff by producing an inorganic hydroxide which acts as a flocculating agent to carry down the major portion of the dyestuff. This inorganic hydroxide may be produced in various different ways, as for instance by adding some base, such as milk of lime, then adding a salt which will form the desired insoluble hydroxide. As examples of such salt, I may use alum, or iron or chromium salts. At or immediately after the formation of the flocculent precipitate, the proper quantity of the activated carbon is added, and the mass is stirred or otherwise thoroughly agitated. The proper degree of heat is essential, not only to increase the activity of the carbon, but to facilitate the proper formation of the flocculent precipitate, which in turn causes prompt and efficient settling.

Instead of the precipitate being a mere flocculating agent which carries down the dyestuff, it may be a precipitate formed by converting the colloidal dyes into a molecular state. The dyestuff, when thus converted from the colloidal condition, will promptly settle. For effecting this action, I may use any water-soluble, inorganic salt, but preferably those having a tri-valent action, such as aluminum, chromium or the ferric salts. A very small quantity of dry salt is added, which converts the colloidal dyestuff into such condition that it promptly settles.

Immediately upon the formation of the properly grained flocks, the activated carbon is added, and the liquid stirred or otherwise agitated. The solid matter is then allowed to settle, until the supernatant liquid is clear and may be decanted or otherwise disposed of, as above indicated. The activated carbon is carried down by the flocks, so that filtration is not necessary, and it also acts to remove such color as is not removed by the flocculation.

Where only relatively small volumes of effluents are to be treated, and particularly where the dyestuffs are in more concentrated form, the activated carbon may be employed without the forming of flocculent precipitate. The activated carbon may be used with or without filter aids, such as diatomaceous earth. The treatment is preferably at high temperature, the nearer to the boiling point, the better. The activated carbon is then filtered out, and the press-cake is steam-blown.

As the next step in my process the sludge or filter cake produced as above described, is revivified to enable the activated carbon to be re-used. The revivification is preferably a chemcial one, and is preferably by an oxidizing agent. To secure this oxidizing action various different reagents may be used, such for instance as a chlorate and hydrochloric acid. The dyestuffs are destroyed by the oxidizing agent, and the insoluble hydroxide, if such be present, is converted into a soluble salt. The activated carbon may be left in the resulting saline solution, and directly added with such solution, at the proper time, to the next batch of effluent to be treated.

If it is desired to recover the mixture of dyes, it is important that they should not be destroyed during the reactivating treatment of the carbon. Under those circumstances, the revivification cannot be accomplished by an oxidizing agent, but must be accomplished by the use of a lixiviating agent which reconverts the dyes into a soluble state, and removes them from the carbon, leaving the latter in condition for further re-use after it is brought to the neutral or slightly acid state.

Inasmuch as the effluents are a waste product, and no manufactured product increases in value by reason of the treatment, it is evident that the revivification of the carbon is important to keep the cost down as low as possible. Because of the fact that the dyestuff is in very dilute solution, and only comparatively small quantities of the activated carbon are employed, the usual revivification of the carbon by heat treatment is impractical.

Although various activated carbons of vegetable origin may be employed, I have found from experiment that that product commonly known as Darco operates the most effectively. This is a product made by the heat treatment of lignite and the removal of such ingredients as are readily soluble in acid.

Having thus described my invention, what I claim as new and desire to secure by Letters Patent is:—

1. The process of decolorizing dye effluents which consists in removing a portion of the dye by forming a flocculent precipitate, removing the balance of the dye by activated carbon, and removing the carbon from the liquid by the settling of the precipitate, the carbon being added before the flocculent precipitate settles.

2. The process of decolorizing dye effluents which consists in treating the same substantially simultaneously with an activated carbon and a reagent which will form a flocculent precipitate and removing said activated carbon by means of said precipitate.

3. The process of decolorizing dye effluents which consists in treating the effluent with an activated carbon, and removing the activated carbon from the effluent by the action of a flocculent precipitate.

4. The process of decolorizing a dye effluent which consists in adding an agent which will form a flocculent precipitate, and at substantially the same time adding activated carbon, the activated carbon acting as an adsorbent agent for the dye in the effluent, and the flocculent precipitate serving to effect rapid settling of the carbon particles to the bottom.

Signed at New York, in the county of New York and State of New York this 1st day of December, A. D. 1925.

PAUL MAHLER.